Dec. 10, 1929. W. E. WILLIAMS 1,738,627
DUPLICATING COPY MACHINE
Filed April 29, 1925 10 Sheets-Sheet 1

Witness:
A. J. Sauser.

Inventor:
William Erastus Williams

Dec. 10, 1929.    W. E. WILLIAMS    1,738,627
DUPLICATING COPY MACHINE
Filed April 29, 1925    10 Sheets-Sheet 2

Dec. 10, 1929.   W. E. WILLIAMS   1,738,627
DUPLICATING COPY MACHINE
Filed April 29, 1925   10 Sheets-Sheet 5

Witness:
A. J. Sauser.

Inventor:
William Eraster Williams

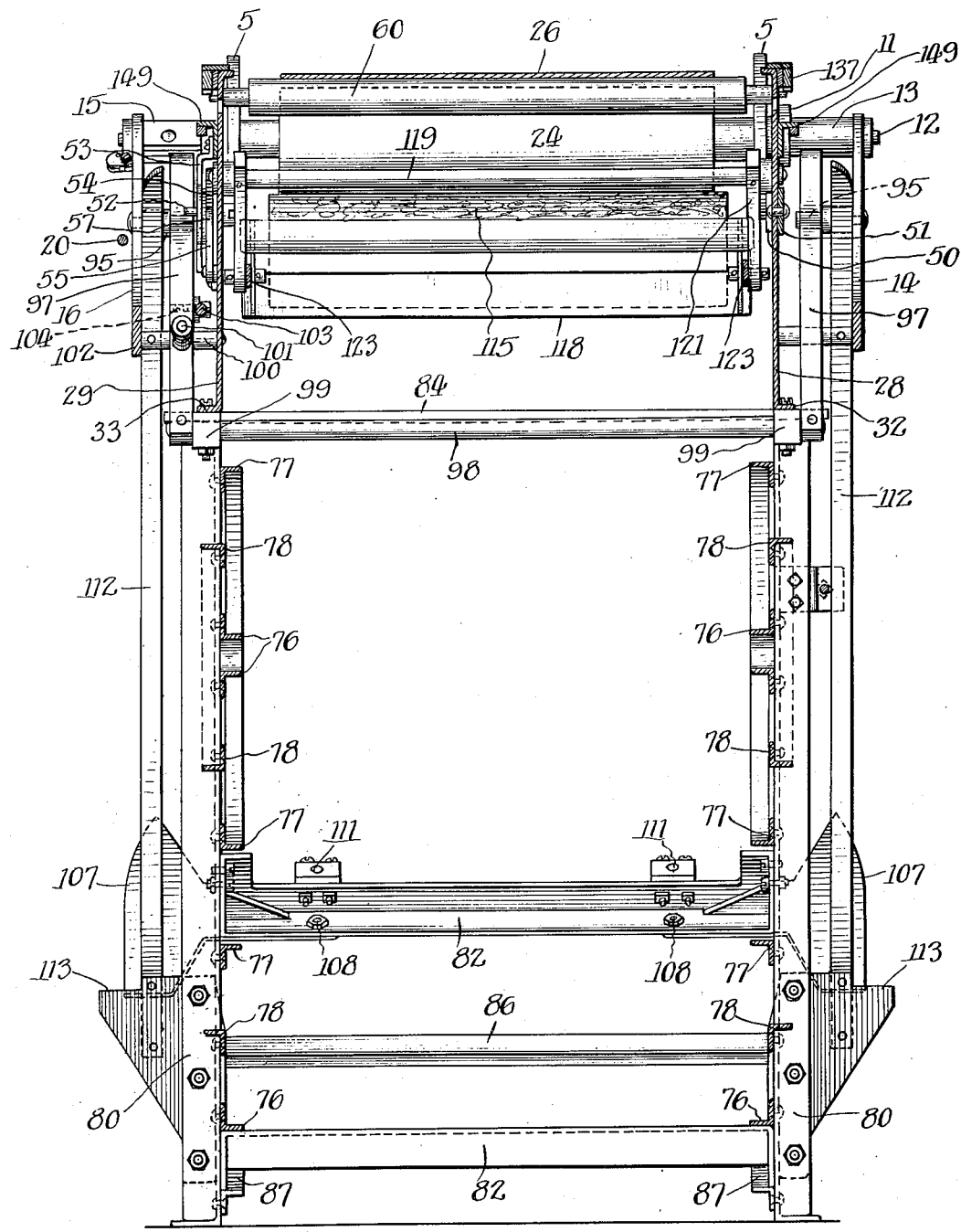

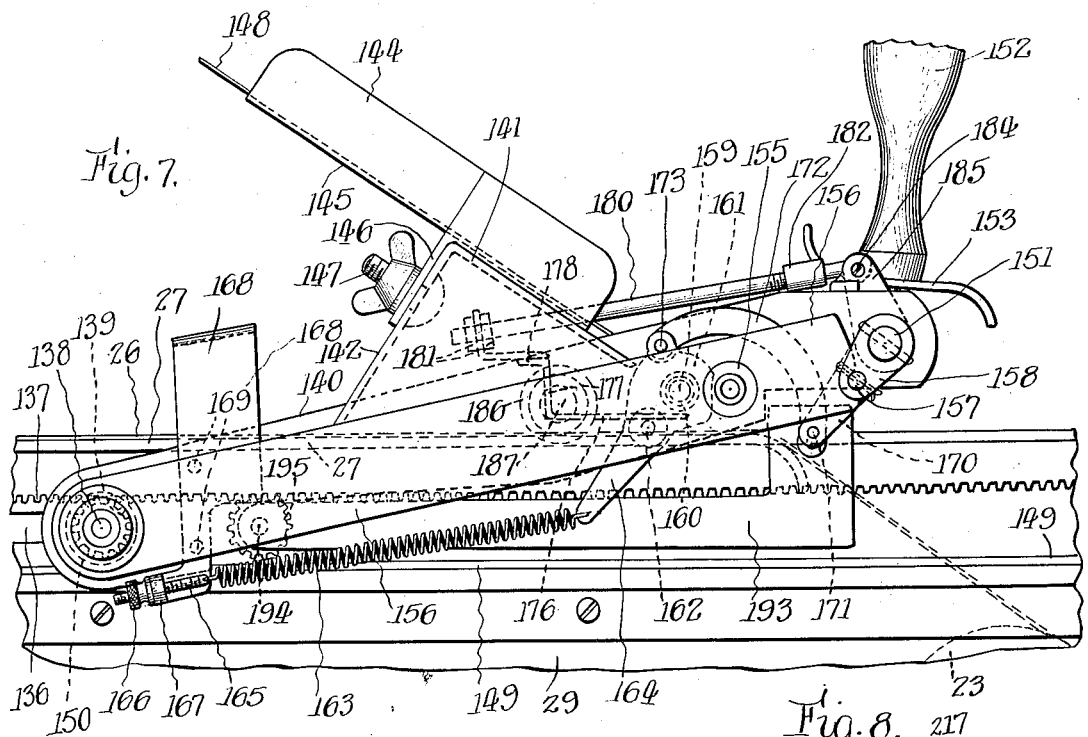
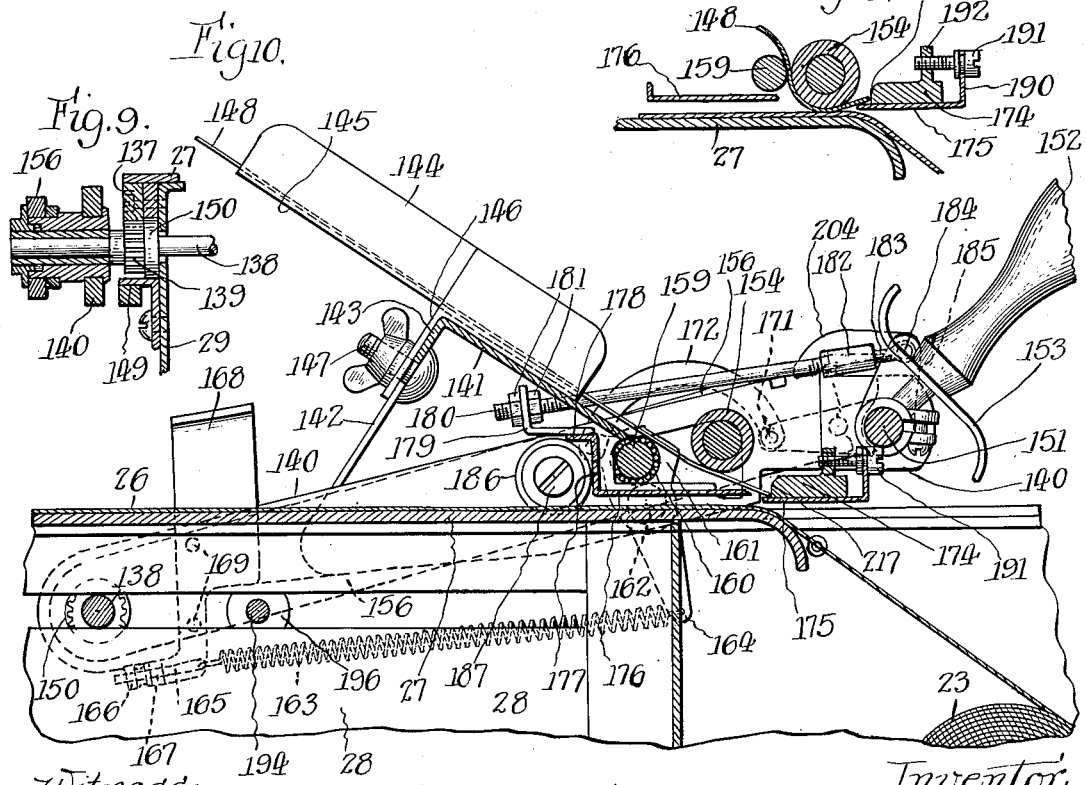

Dec. 10, 1929.  W. E. WILLIAMS  1,738,627
DUPLICATING COPY MACHINE
Filed April 29, 1925   10 Sheets-Sheet 8
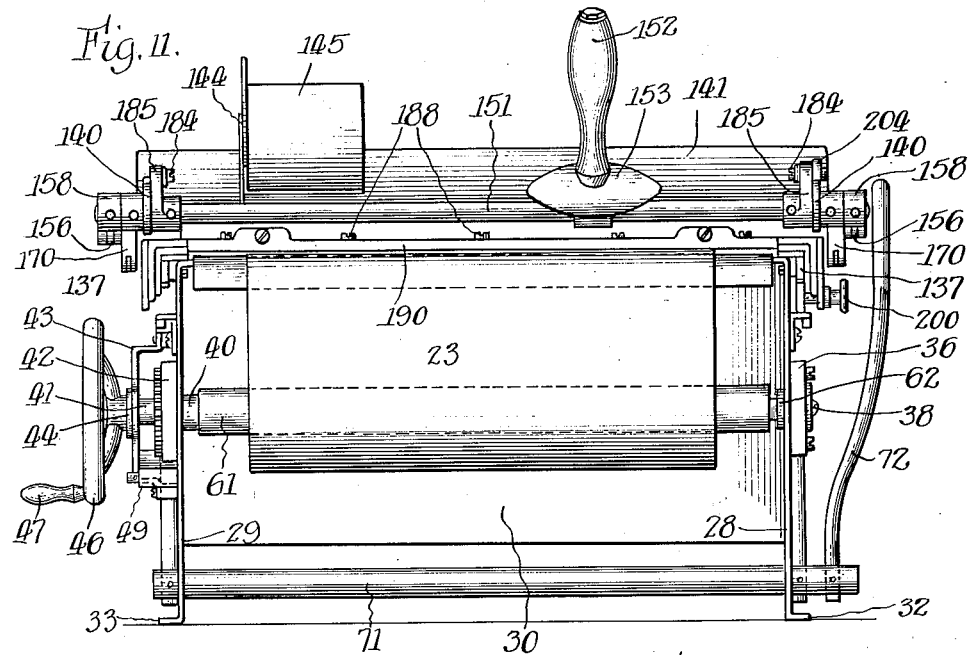
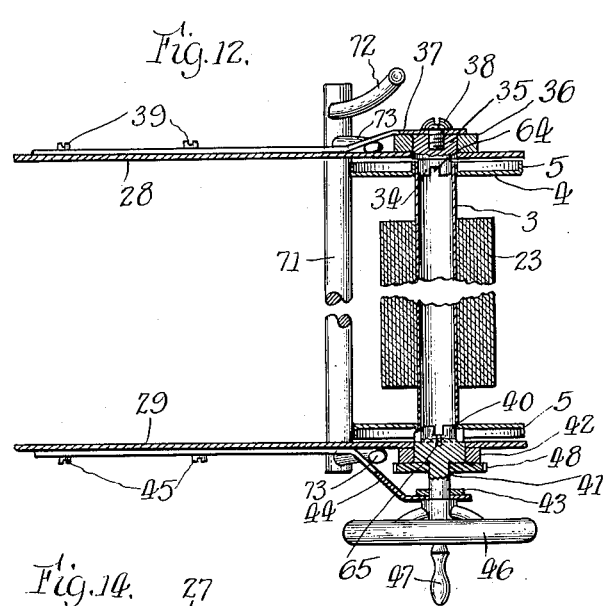
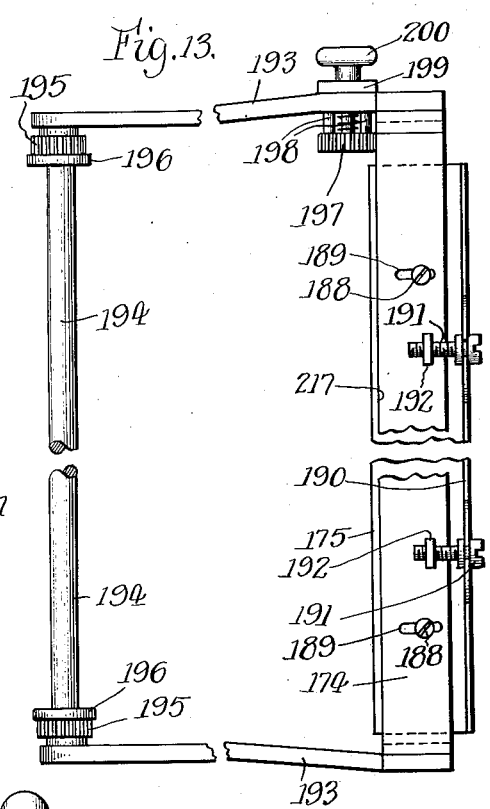
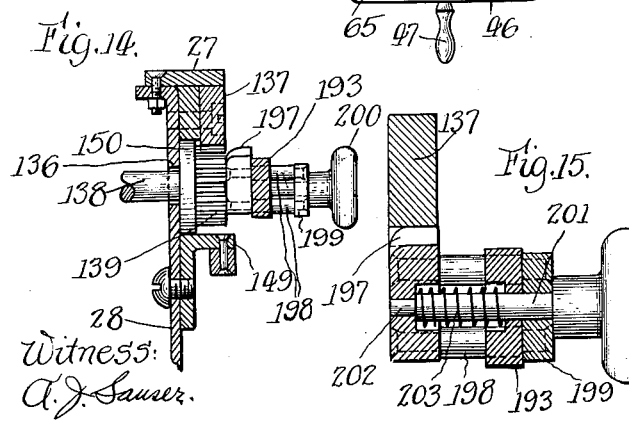
Inventor:
William Erastus Williams
Witness:
A. J. Sauzer Dec. 10, 1929.  W. E. WILLIAMS  1,738,627
DUPLICATING COPY MACHINE
Filed April 29, 1925  10 Sheets-Sheet 9
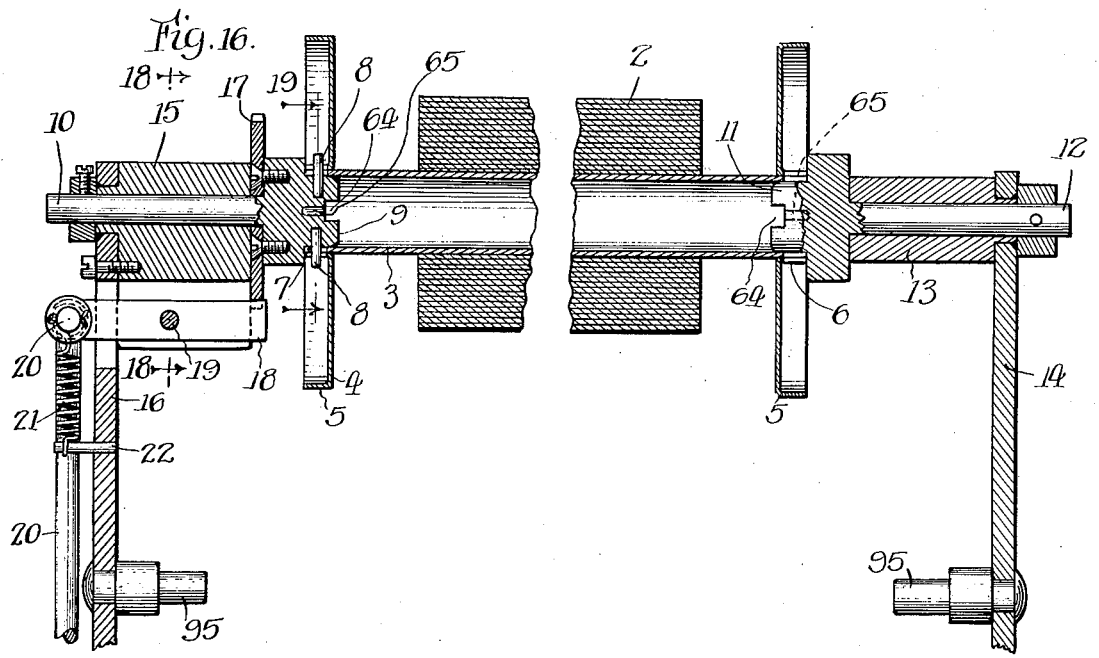
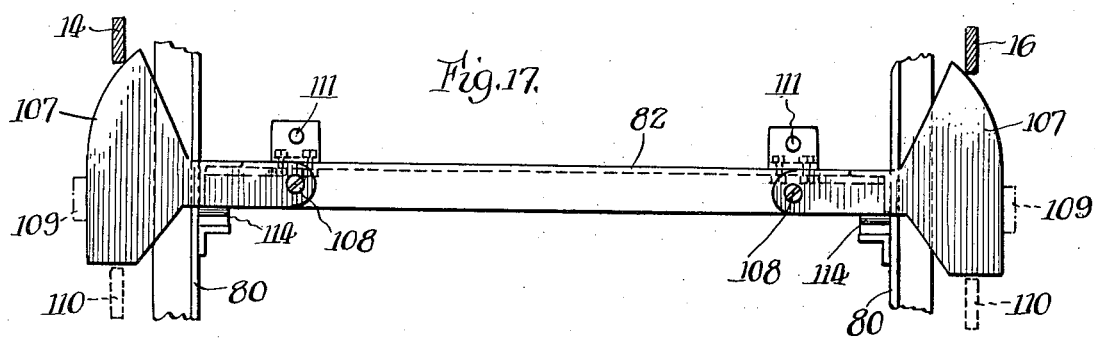
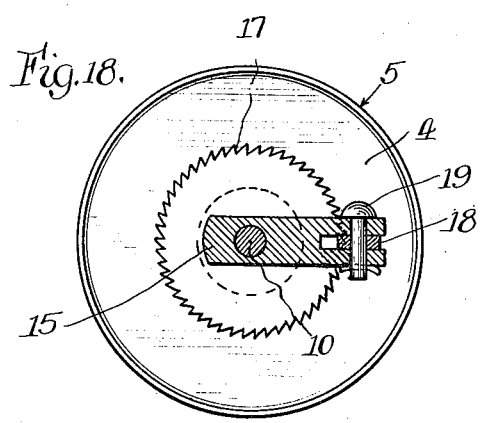
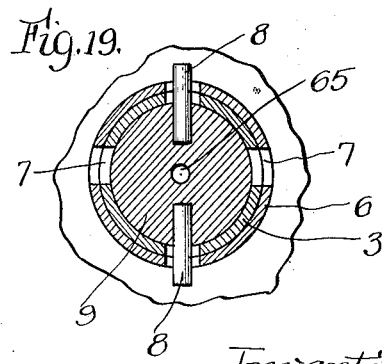

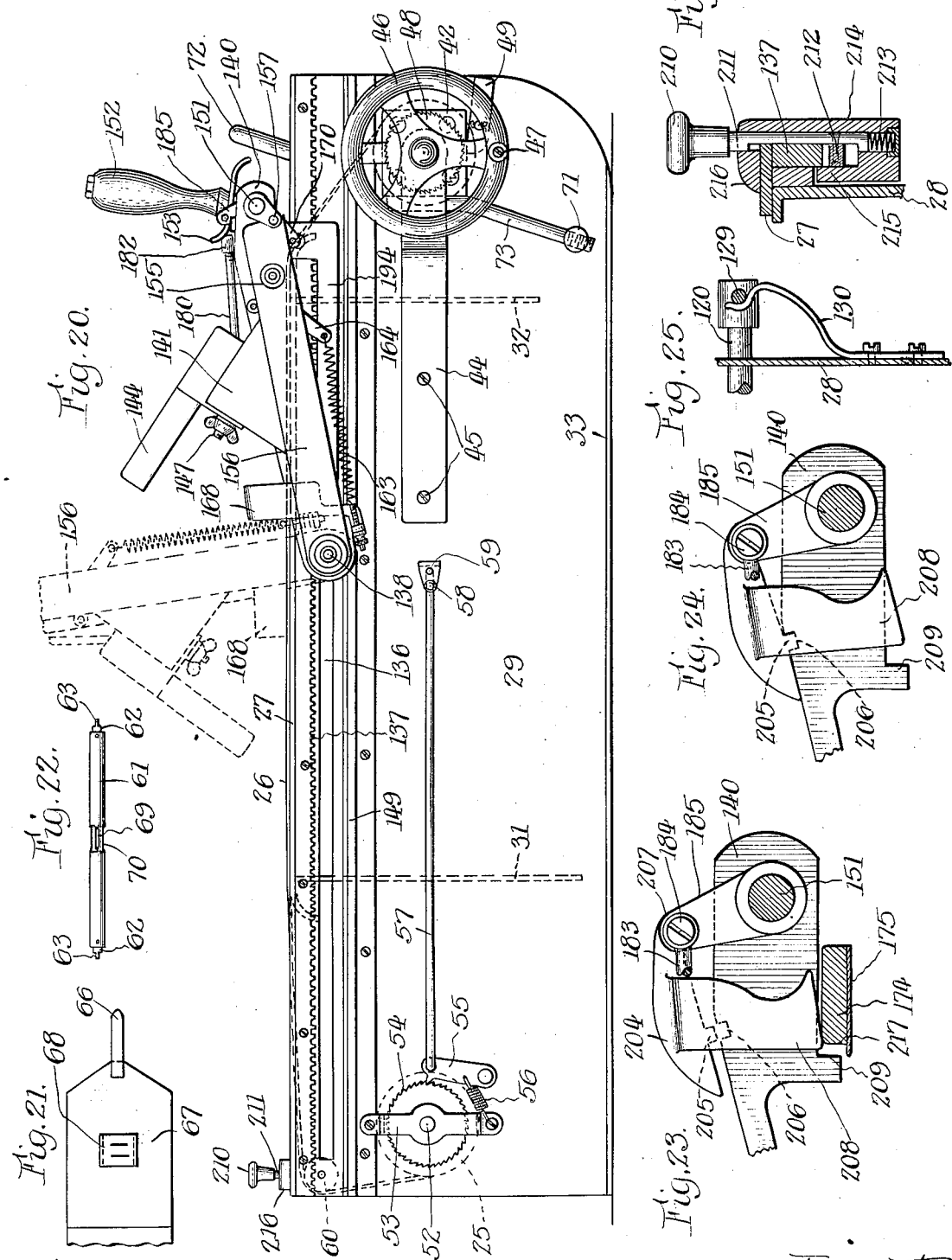

Patented Dec. 10, 1929

1,738,627

UNITED STATES PATENT OFFICE

WILLIAM ERASTUS WILLIAMS, OF WILMETTE, ILLINOIS, ASSIGNOR TO DITTO, INCORPORATED, OF CHICAGO, ILLINOIS, A CORPORATION OF WEST VIRGINIA

DUPLICATING-COPY MACHINE

Application filed April 29, 1925. Serial No. 26,777.

My invention relates to a machine for making copies from a gelatin sheet on the hectograph principle, the gelatin sheet being in the form of a long strip which is passed over a bed of the machine and wound off from one spindle at one end of the bed onto a spindle at the other end of the bed as different sections of the gelatin sheet are used for copying purposes.

The object of the invention is to provide accurate means for registering a sheet of paper to a given spot on the gelatin sheet on the bed and impress the same by an impression roller in the most efficient way and to withdraw the sheet of paper from the gelatin sheet and to provide means for securing and releasing and revolving the spindles which carry the gelatin web in the machine and to provide a magazine for additional rolls of the gelatin sheets generally termed gelatin rolls and a further object of the invention is to provide means for automatically taking rolls successively from the magazine in connection with the placing of the same in position to hold a gelatin sheet in working association with the bed of the machine. Other details of merit reside in the method of holding the impression roll squarely to the bed of the machine in all positions of its travel and for providing an adjustable marginal stop for registering the ends of the sheets of paper to be operated upon by the machine.

Other special detail merits will hereinafter be set forth.

Reference will be had to the accompanying drawings in which Figure 1 is a longitudinal vertical sectional elevation of the upper part of the machine looking from the left side of the machine.

Figure 6 is a vertical sectional elevation on line 6—6 of Fig. 2.

Figure 7 is an enlarged elevation of the end of the impression carriage being that end of the carriage at the left of the machine.

Figure 8 is a transverse sectional detail of the impression roller and the paper stop when the impression roller first presses the paper to the gelatin sheet.

Figure 9 is a transverse sectional detail showing the position of one of the side racks and the gear and roller in connection therewith.

Figure 10 is a similar view to that of Fig. 7 being a section, however, on line 10—10 of Fig. 4.

Figure 11 is a front elevation of the machine without the magazine for the rolls.

Figure 12 is a plan sectional detail through the roll spindle at the front of the machine.

Figure 13 is a plan view of the paper stop.

Figure 14 is a vertical cross section of the upper right hand corner of the frame of the machine showing the locking device for the paper stop when the same is ready to be adjusted backward or forward.

Figure 15 is an enlarged sectional elevation through the locking device for the paper stop.

Figure 16 is a plan sectional view through the gelatin roll spindles and the ends of their supporting arms at the rear of the machine.

Figure 17 is a view at the rear of the machine showing the guiding cams for the spindle carrying arms.

Figure 18 is an elevational view of the ratchet and pawl mechanism through line 18—18 of Fig. 16.

Figure 19 is a vertical section on line 19—19 of Fig. 16.

Figure 20 is a side elevation of the left side of the machine when used in the modified form used without the magazine for the rolls, this figure showing the machine arranged in the same manner as that indicated by Figs. 5 and 11.

Figure 21 is a plan view of the end of one of the gelatin roll sheets.

Figure 22 shows a wooden spindle.

Figure 23 is a vertical elevational detail of a locking catch for the operating lever when the lever is unlocked.

Figure 24 is a similar view to that of Fig. 23 with the catch locked.

Figure 25 is a transverse view at the right of the machine showing a catch for a lever that withdraws the water box.

Figure 26 is a vertical cross section of the carriage stop at the rear of the machine.

Figure 5:
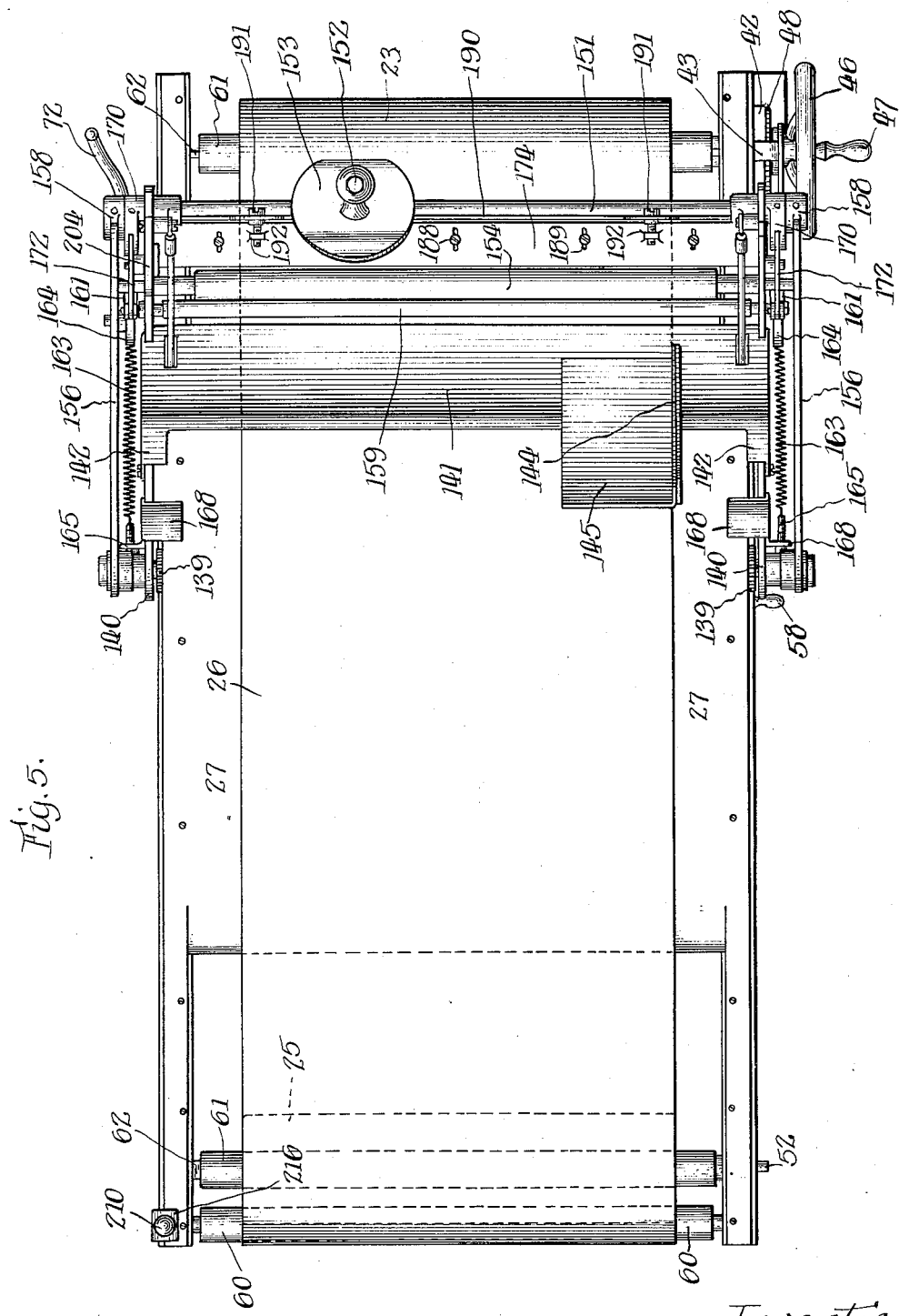
Figure 5 is a similar plan view of the machine showing a modified form of the same, modified chiefly as relates to the absence of the use of the magazine for storing the gelatin rolls.

The machine as shown in the drawings is so constructed that it may be used as an ordinary bench machine without using the magazine for the rolls, Figs. 5, 11 and 20 show it so arranged. The gelatin sheet, see Fig. 16, sheet 9, is indicated by 2 and is wound upon a spindle 3, the spindle here shown being a hollow tubular spindle on each end of which there are flanges 6 which are welded or soldered onto the tube 3.

The tube ends and the flanges 6 are notched out at 7 to be engaged by pins 8 of the plug end 9 of the left hand carrying spindle 10 which is the spindle which regulates the unwinding of the gelatin sheet 2 on the spindle 3. The right hand carrying spindle 12 has a similar plug end 11 but without pins 8 and this end 11 is a part of the spindle shaft 12. The shaft 12 is carried in a block 13 fixed into the right carrying arm 14 and the spindle 10 is carried in the block 15 which is fixed to and as it were made a part of the left arm 16.

Onto the spindle 10 there is fixed the ratchet 17 which is engaged as desired by a pawl 18 hinged at 19 into the block 15 and the pawl 18 is hinged to a rod 20 which runs back to an operating lever at the left of the machine.

A spring 21 secured to a pin 22 in the arm 16 normally holds the pawl 18 in engagement with the ratchet 17. Thus when the roll magazine is used with the machine the structure shown in Fig. 16 becomes the rear spindle holding means.

The means for carrying the roll spindle at the front of the machine is shown in plan section in Fig. 12 and in so far as holding and supporting the roll carrying spindle 3 it is substantially the same as the rear spindle just described. The gelatin sheet 2 as it appears partly wound on the front spindle of the machine is indicated by 23 and at the rear of the machine when the magazine is used it is indicated by 24, Fig. 1, but when used as a bench machine the gelatin roll on the rear spindle is indicated by 25, see Figs. 5 and 20, sheets 5 and 10.

In place in the machine that part of the gelatin sheet which passes over the bed of the machine and is active in the hectograph work is indicated by 26. The impression bed of the machine is indicated by 27 and it is the top cross member of a three-sided box frame having the right vertical longitudinal wall 28 and the left vertical longitudinal wall 29 and these walls are connected across to each other by cross plates 30 and 31, see Fig. 1. Flanges 32 and 33 of the walls 28 and 29 furnish the bench supporting surface for the machine when used as a bench machine and furnish the base connection for the machine when connected to the roll magazine frame.

The spindle 3 at the front of the machine, see Fig. 12, is supported on the plug end 34 of the right spindle block 35 mounted to revolve in a bearing 36 of the frame and connected to revolve in an aperture of a spring 37 by means of a screw stud 38.

The spring 37 is fastened by screws 39 to the frame piece 28 of the machine. The left front end spindle 3 is supported on the plug end 40 on a spindle shaft 41 and this shaft 41 is mounted to revolve in a bearing 42 on the frame piece 29 and the other end is supported in a keeper 43 also secured to the frame piece 29. On the outer end of the spindle shaft 41 there is a hand wheel 46 having a crank handle 47 by which the spindle shaft 41 is revolved.

A ratchet wheel 48 is secured to the plug end 40 and is fixed to revolve therewith. A pawl 49, see Figs. 11 and 20, holds the ratchet from revolving in a backward direction.

Figure 2:
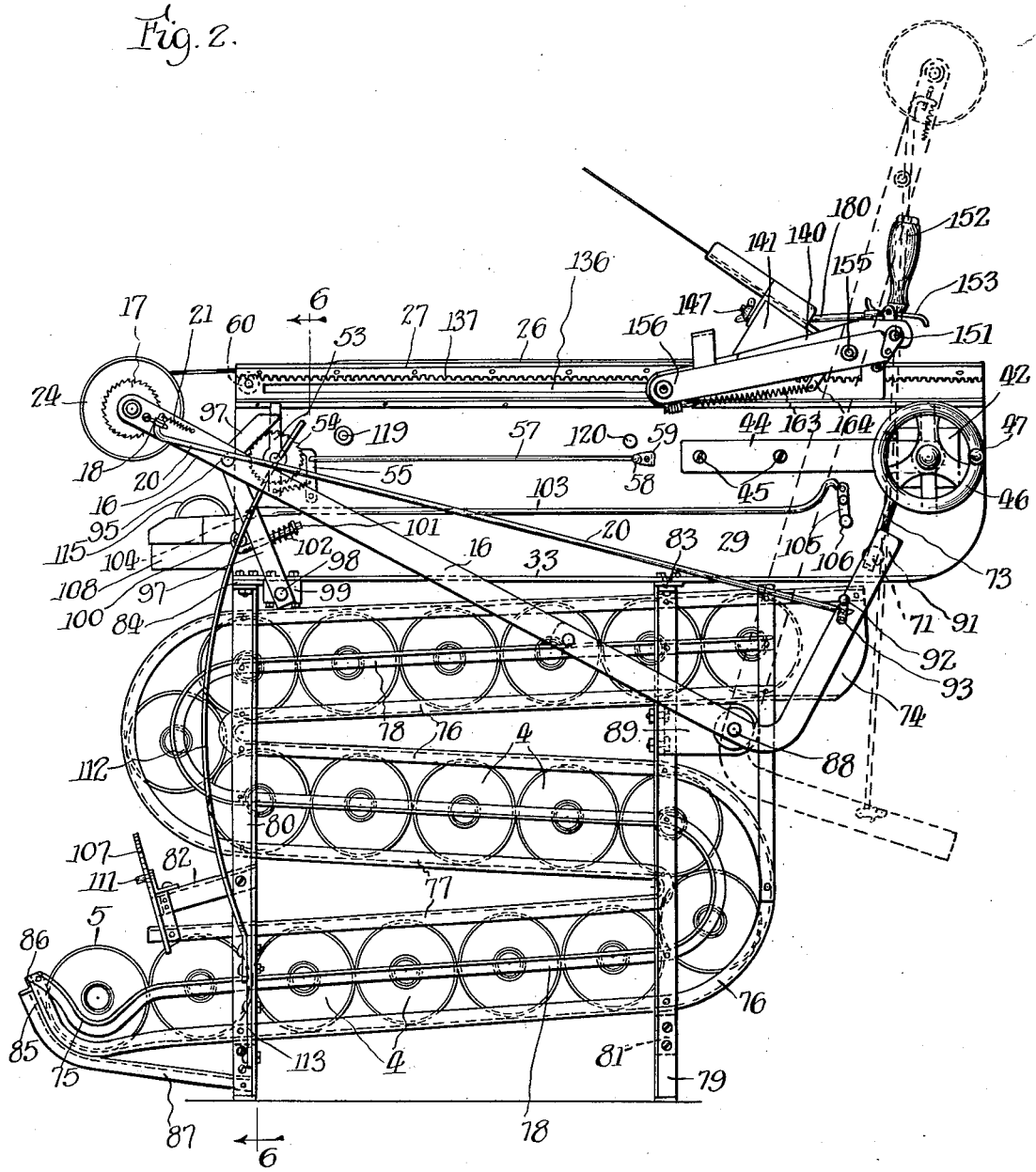
Figure 2 is a full left side elevation of the machine on a smaller scale from that shown in Fig. 1.

Thus in the form of the machine shown in Fig. 2 by means of the hand wheel 46, ratchets 48 and 17 and pawls 49 and 18 the gelatin sheet may be wound from the position of 24 to the position of 23 and held taut over the bed 27 in any given position as desired.

Figure 1:
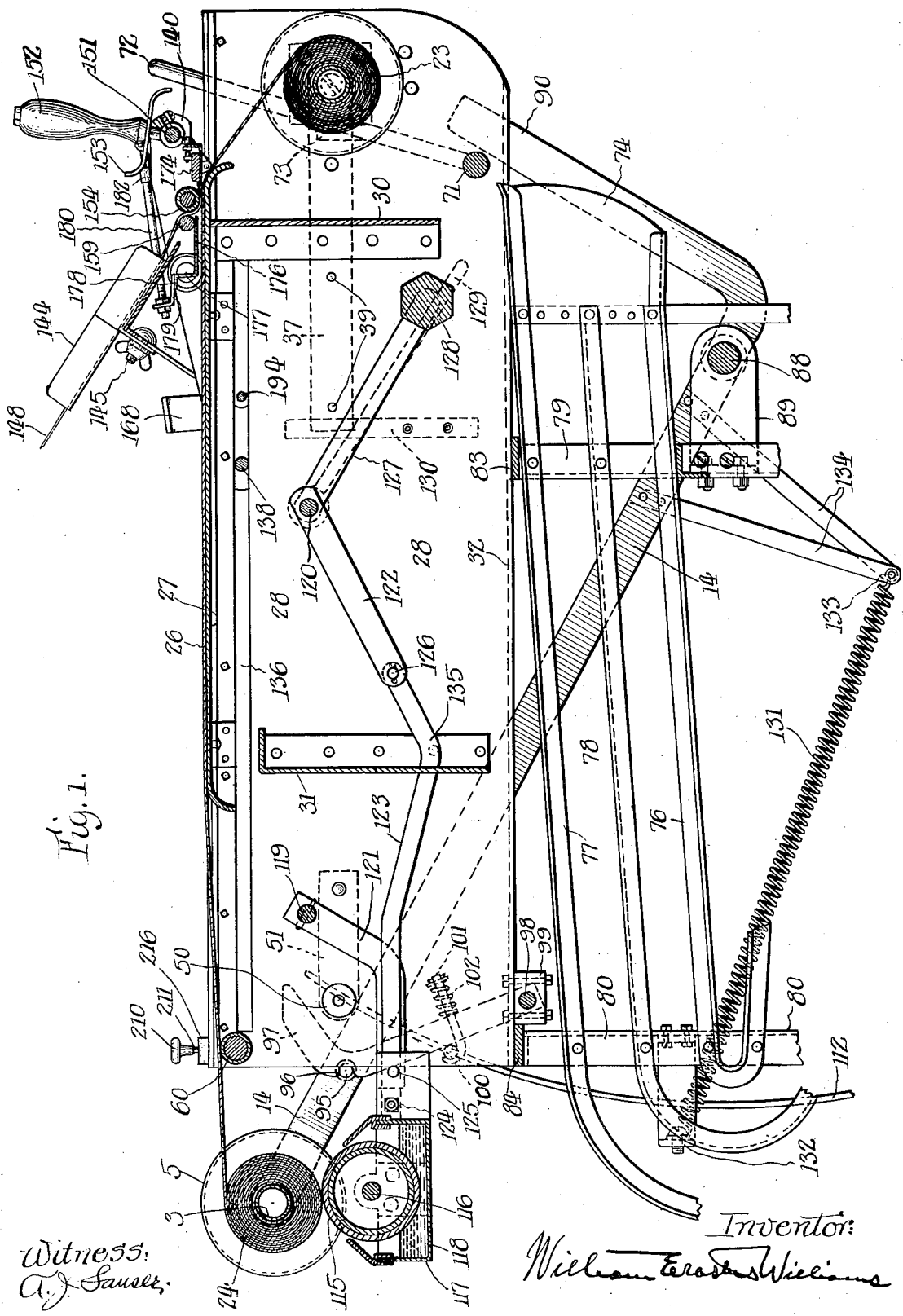

For use of the machine as a bench machine in accordance with Figs. 5, 11 and 20, I provide the spindle shaft 50 on the right of the machine, held in place by the spring 51, see Fig. 1, and the short spindle shaft 52 on the left of the machine, see Fig. 20, held on its outer end by the keeper 53 the inner end being supported in the frame piece 29. A ratchet 54 and a pawl 55 controlled by the spring 56 permits the operator through the rod 57 to control the release of the gelatin strip from the roll 25 at the rear of the machine to be drawn forward to the roll 23 at the front of the machine as desired.

The rod 57 is connected to a little hand lever 58 pivoted at 59 for convenience of the operator in controlling the movement of the rod 57.

At the rear of the machine there is provided the idle roller 60 over which the web of the gelatin sheet is trained.

While I desire to use the tubular spindles 3 with the flanges 4 and treads 5, I may use a wooden spindle shown in Fig. 22, having the round body portion 61 provided with flat gudgeons 62, with the round trunnion ends 63 and such a spindle is indicated in Fig. 5 in the bench form of the machine.

However, these spindles 61 may be used entirely in place of the spindles 3 since there is provided a notch 64 and cavities 65 in the plug ends of all the other spindles, see Figs. 12 and 16.

The ends of the gelatin sheet are indicated by Fig. 21 and terminate in small straps 66 at each end of the gelatin sheet being trimmed on the end by a cloth piece 67 which is provided with some tucks or keeper pieces 68 which permit the strap end 66 to be enwrapped around the roll when it is wound up and tucked in through the keeper folds 68. The strap ends 66 are tucked into the slots 69 in the middle portion 70 of the spindles 3 and 61 and this middle portion 70 being reduced sufficient to take up the length of the strap 66 without enlarging the central portion of the roll of gelatin when wound up. This central connecting feature of the gelatin with the spindles is common with the spindles 3 and 61.

In the operation of releasing the spindle at the front of the machine from the embrace of the spindle plugs 34 and 40 I provide a rocker shaft 71, see Figs. 3, 11, 12 and 20, having an operating handle 72 and provided with lever arms 73 which are interposed between the frame pieces 28 and 29 and the springs 37 and 44 and thus by the movement of the hand lever 72 the arms 73 wedge the springs 37 and 44 outward and carry with them the plugs 34 and 40 and thus release the spindles 3 to permit its removal or replacement as desired.

At the rear end of the machine, see Fig. 16, the arms 14 and 16 are sprung apart or one of them sprung as may be desired by the operator and thus release the spindle 3 from the embrace of the plugs 9 and 11.

When the machine is used as a bench machine in accordance with Fig. 5 the operator pushes the spindle with its roll 25 toward the right pushing the plug 50 against the spring 51, see Fig. 1, until the other end of the spindle is released from its plug and the spindle 61 thus removed.

When a gelatin sheet has been completely used in the service of hectograph work over the bed 27 it has been fully wound up onto the front end spindle in the roll 23 and the roll 24 at the rear end entirely exhausted, see Figs. 1 and 2. Thus the spindle 3 at the rear of the machine or left end of the Figs. 1 and 2 will be vacant while the spindle at the front of the machine at the position of 23 will be complete and filled; thereupon the operator removes the loaded spindle from the front of the machine and reverses it end for end and places it in the magazine track in the magazine frame below the frame pieces 28 and 29 the spindle being carried in the magazine tracks by the wheel treads 5 of the flanges 4 of the spindles 3.

The magazine is an S-shaped trackway or chuteway having the receiving end at 74 at the front of the delivery end at 75 at the rear and down near the floor, see Fig. 2.

This S-shaped chuteway is made of angle iron bars 76, 77 and 78; the bars 76 and 77 forming the two sides of the chuteway while the bar 78 forms the endwise guard at the middle of the chuteway and these bars are secured into the vertical supporting posts 79 and 80 connected by cross members 81 and 82 along with the flat cross bar members 83 and 84 secured to the flanges 32 and 33 of the frame pieces 28 and 29. The inclination of the chuteway is such that a roll which is placed in at the entrance at 74 will automatically roll by gravity down through the chuteway to the delivery end 75 which end is dammed off as it were by the turned up portion of the chuteway at 85 having a cross tie member 86 and supporting braces 87.

The arms 14 and 16 are fixed to a cross shaft 88, see Fig. 1, which is supported in bearings 89 in the vertical frame post piece 79 and the inner ends of these arms 14 and 16 are turned up in the hand lever ends 90 and 91; 90 being on the right of the machine and 91 on the left. To this hand lever end 91 there is connected a small crank with a handle 92, see Figs. 2 and 3, on a hinge pin 93 in the end 91 of this crank and is connected at 94 to the rod 20 which operates the ratchet pawl 18 by means of which crank the pawl 18 is released from engagement with the ratchet 17 as desired.

The arms 14 and 16 are provided with stud pins 95 adapted to be engaged by notches 96 in the lever arms 97 fixed on a shaft 98 supported in bearings 99 onto the flanges 32 and 33 of the frame pieces 28 and 29, see Figs. 1 and 2.

A fixed stud 100 in the frame piece 29 limits the movement of the lever arms 97 in swinging to the left in Figs. 1 and 2 and the said arms are held normally in such position by a stud bolt 101 and spring 102.

A rod 103 is hinged at 104 to one of the arms 97 and this rod is connected to a crank 105, see Fig. 1, having a handle 106 by means of which the arms 97 are held toward the front compressing the spring 102 to allow the release of the studs 95 from the notches 96 of the arms 97, thus permitting the operator by the handles 90 and 91 to swing the outer ends of the arms 14 and 16 about the shaft 88 in picking up a fresh loaded spindle from the delivery end of the chuteway at 75.

When the spindle 3 at position of 24 at the left or outer end of the machine as indicated in Figs. 1 and 2 is exhausted of its gelatin strip the operator releases the arms 97 from the studs 95 of the arms 14 and 16 and rotates the arms 14 and 16 to the dotted position shown in Fig. 2 which then brings the empty spindle in easy reach of the operator who sits or stands at the right or front of the machine in the said Figs. 1 and 2.

Thereupon the operator takes the empty spindle out from the embrace of the arms 14 and 16 by springing the arms apart and places the empty spindle into the position of 23 at the front of the machine and thereupon the operator revolves the arms 14 and 16 back and around and down to the position 75 or the delivery end of the chuteway and automatically picks up a fresh loaded spindle.

The means by which the fresh loaded spindle is enabled to be engaged by the plug ends 9 and 11 is provided in the form of the rocking cam blocks 107, see Fig. 17, hinged at 108 in the cross member 82 of the chuteway frame. As the arms 14 and 16 descend they engage the curved surfaces of the cams 107 which spreads the arms apart to the dotted position 109 which enables the plug ends 9 and 11 to clear the ends of the wheel flanges 5 of the spindle 3.

As the arms 14 and 16 move down from the dotted position 109 to the lower ends of the cam blocks 107 to the dotted position 110 of the arms the blocks 9 and 11 are then in exact registry of the ends of the spindle tube 3 and the spring of the arms 14 and 16 are engaged into the spindle of the lowermost roll in the chuteway at 75. Then as the arms 14 and 16 are raised upward the cam blocks 107 rotate about their hinge pins 108, upwardly until the arms 14 and 16 have moved entirely apast the cam blocks 107 whereupon the cam blocks 107 drop back into their normal position as shown in Fig. 17, ready for another functioning of the arms 16 in taking out another roll from the chuteway, gravity having caused the rolls in the chuteway to revolve down bringing the fresh roll into position at 75 and thus accommodating room at 74 end of the chuteway for receiving at the front of the machine.

Stop pins 111 on the cross frame member 82 prevent the cam blocks 107 being thrust too far upward so that they will always drop back by their own gravity.

The arms 14 and 16 are somewhat springy in character and to properly guide them in their movement and hold a roll which is carried in the spindles at the ends of these arms to be always carried centrally there is provided the guiding bars 112 best observed from Figs. 1, 2 and 6.

Stop brackets 113 are secured to the posts 80 to arrest the movement of the arms 14 and 16 in the right position to engage the roll spindles and this position is at the point where the arms 14 and 16 have passed just below the cam surfaces of the cams 107.

Stops 114, Fig. 17, hold the cam blocks 107 in proper position for the registry of the arms 14 and 16 into the ends of the tube spindles 3. In the use of gelatin surface for hectograph work it is necessary to apply moisture thereto in order to secure the copy desired, and this moisture has usually been applied by hand through the medium of a sponge or other water carrying vehicle.

I provide for automatically moistening the gelatin sheet through the medium of a felt covered roller rolling on contact with the gelatin sheet and the roller immersed in a bath of water beneath. This moistening device is best observed in Figs. 1, 2 and 6 wherein the felt covered roller is indicated by 115 supported on a shaft 116 and mounted to be revolved in the water 117 of a water box 118 and the roller is automatically held up in contact with the unwinding gelatin sheet at the position 24. This water box 118 is normally in the position shown in Fig. 1 in the use of any given gelatin roll but when a new roll is to be brought into position 24 the water box with its roll must be retreated out of the way to allow for the passage of a fresh roll from the position 75 of the delivery end of the roll magazine.

To accomplish the retreat and advance to the contact position of the moistening roll 115 with the gelatin roll I provide a link motion somewhat after the manner of the parallel ruler arrangement to carry this water box 118 with its roller 115.

The link motion is composed of a shaft 119 and a shaft 120 extending between and supported by the frame side walls 28 and 29 and connected to the shaft 119 there are some curved links 121 and to the shaft 120 some straight links 122 and these two series of links are connected together by two bars 123. These bars are secured to the water box 118 by the bolts 124 and 125, the latter bolts acting also as the hinge pins for the curved links 121. The arms 123 are connected by hinge pins 126 to the aforementioned links 122 and the distance between the pins 125 and the pins 126 is the same distance as between the shafts 119 and 120 and thus by this construction the water box is normally held level and may be swung upward to contact with the unwinding gelatin roll at position 24. This upward swinging motion is automatically produced by the weighted arms 127 on the shaft 120 and they carry a weight 128 which weight is normally heavy enough to hold up the water box with its roll always in contact with the gelatin roll at position 24 throughout the entire change in diameter of the roll as the gelatin sheet is unwound.

Figure 3:
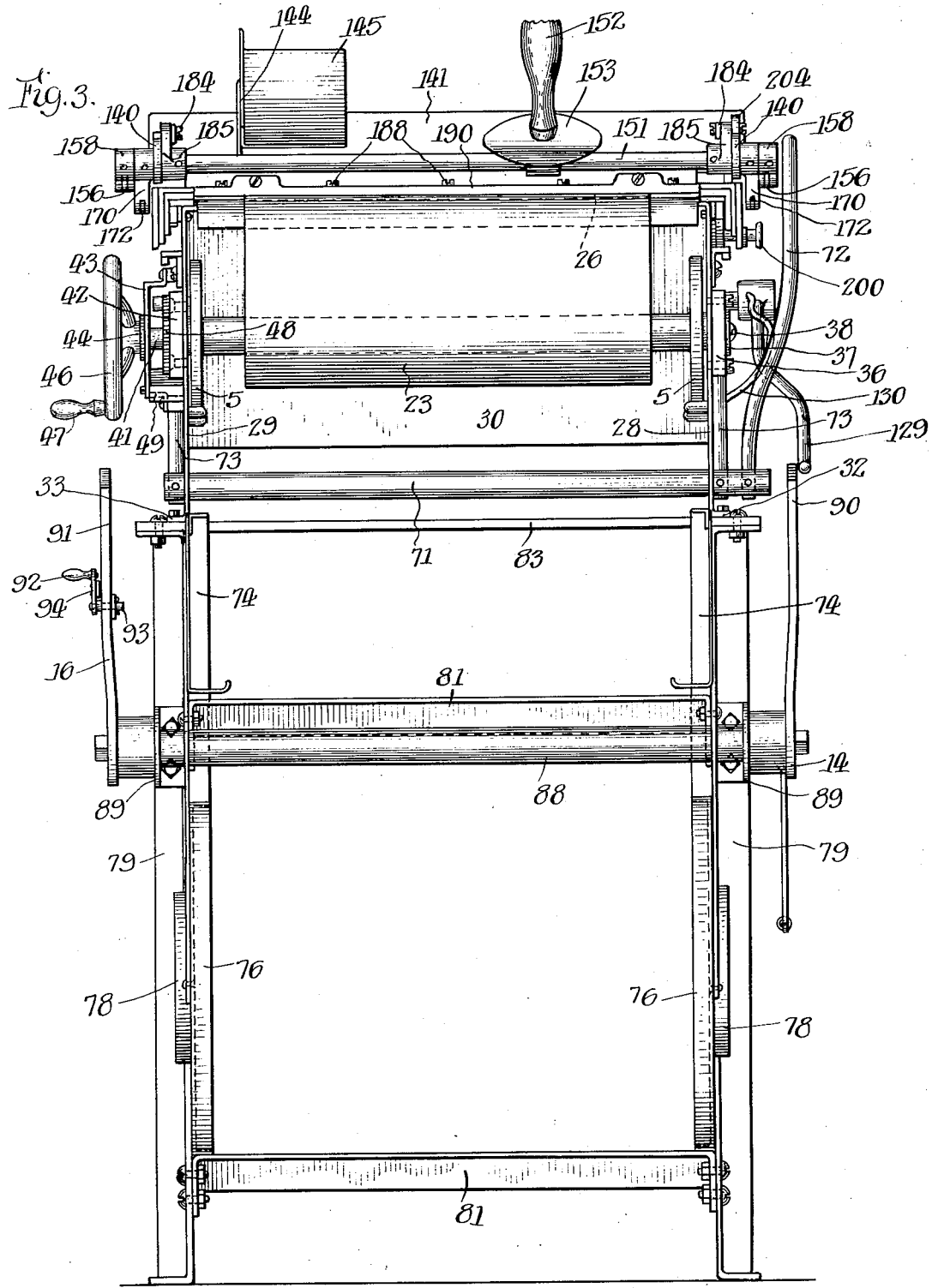
Figure 3 is a front end elevation of the machine on a scale approximating that of Fig. 1.
Figure 4:
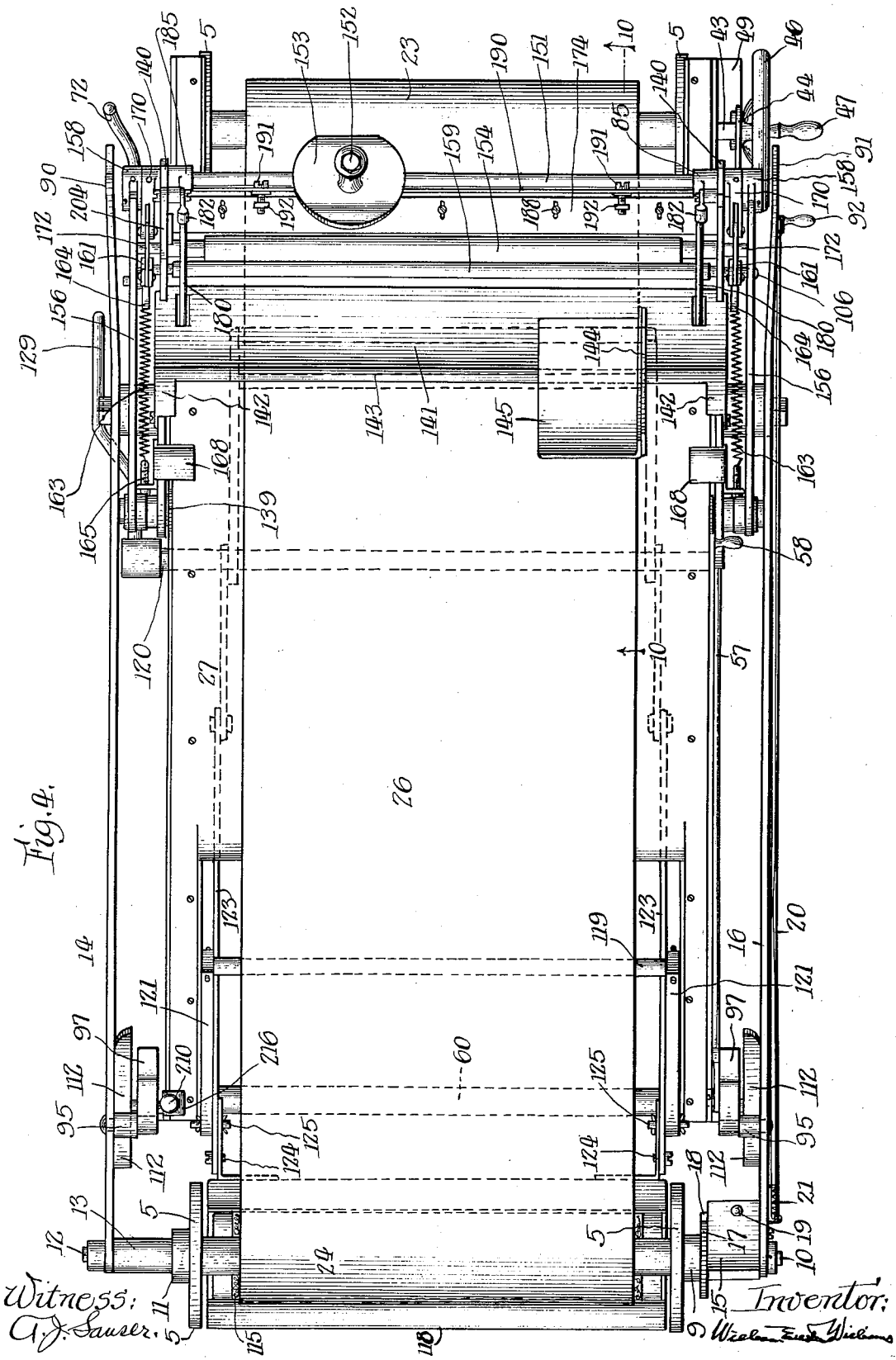
Figure 4 is a plan view of the machine.

The shaft 120 sticks out to the right of the machine and is provided with an operating lever 129, see Figs. 3, 4 and 25. A spring clasp 130 holds the operating lever 129 up and the water box downward out of the way whenever the operator desires to bring a fresh roll from the position 75 of the roll magazine up to the position 24 for the operating use of a fresh gelatin roll. The water box is shown in retreated position in Fig. 2 which allows clearance for the passage of the fresh gelatin roll from the magazine up to position 24.

In the operation of the arms 14 and 16 it is desirable that there be no sudden shock owing to the unbalancing of the load on the arms due to the fact that they have at times a full roll and at other times no roll or spindle at all. I provide a counter balancing device in the form of a spring 131, Fig. 1, secured to a bracket 132 fixed to one of the posts 80 and the other end of the said spring is hinged at 133 to the arms 134 secured to the arm 14. The character of this spring is such to furnish a normal counter balance for the arms 14 and 16 about the shaft 88.

The curved shape of the links 121 which are a part of the support of the water box are so curved as to clear the spindle 50, so that the latter may remain with the machine ready to be used as a bench machine without the necessity of removing the spindle 50 when the water box connections are put in place. The curved portion 135 of the bars 123 are made in order to clear the web of the cross connecting plate 31 as these bars 123 are passed through slots in the cross frame piece 31.

The means for applying the paper to the portion 26 of the gelatin sheet on the bed 27 is termed the impression carriage which is mounted to be moved backward and forward over the bed 27.

Cooperating with the impression carriage there is a paper stop or abutment member which extends across the bed and is adapted like the carriage to be moved forward and back lengthwise of the bed 27 over the gelatin sheet to furnish an end stop or abutment for the sheet of paper to be registered on the gelatin sheet and to furnish this registration at any position forward or back along the bed 27.

It is necessary that the impression carriage shall be moved squarely forward and back over the copying surface and likewise it is necessary to hold this paper stop or abutment in exact registry squarely as it is moved forward and back over the gelatin surface.

In order to insure the holding of the impression carriage and the paper stop squarely in their position over the bed I provide a slot 136 through each side frame member 28 and 29. This slot is located up near to the bed plate 27 and on the outside of each one of these side frame members 28 and 29 and underneath the bed 27 I provide gear rack bars 137 and extending across through the slots 136 there is a shaft 138 upon which there are fixed gear wheels 139, see Figs. 7 and 9, and the ends of this shaft 138 are journaled into the main side frame piece 140 of the impression carriage.

These side frame pieces 140 are connected across rigidly by cross frame member 141, Fig. 10, which acts as a guide for the paper to the impression roll of the impression carriage and this member 141 is turned down at its ends into the projections 142 which are secured to the side frame members 140. A stiffening flange 143, see Fig. 10, is provided for the web or body of the cross member 141. An adjustable side guide for the paper that is placed on this frame member 141 is provided in the form of a side flange 144 having a flat body portion 145 resting on the main body of the cross member 141. A projecting flange 146 of this side guide 145 is provided with a clamping screw 147 which enables the side guide to be adjusted across the frame member 141 for different widths of paper, the paper here being indicated by 148.

Underneath the gear rack bars 137 there are the side rail track members 149 best observed in Figs. 7, 9 and 14 and the purpose of this track is to support the idle rollers 150 mounted on the shaft 138 inside of the rack gears 139. The purpose of the rollers 150 is to hold the gears 139 into the proper pitch association with the rack teeth. Thus on the movement of the carriage backward and forward along the bed 27 it must move the same distance on each side as the gears 139 are fixed to the shaft 138 and when one of them moves the other must also move thus the carriage is normally held square on the bed 27.

Extending across the impression carriage from frame piece to frame piece 140 and slightly beyond each side thereof there is a shaft 151 which is the operating shaft of the impression carriage. Fixed to this shaft there is an operating handle 152 provided with a hand guard plate 153. By means of this handle 152 the impression carriage is moved forward and back over the bed 27 of the machine and the shaft 151 is rocked through an arc of about 45° in the clamping and unclamping of the paper into the embrace of the impression roll and this clamping roll is in contact with the paper as the same is placed on the gelatin sheet portion 26.

The impression roll is indicated as 154 and is journaled in roller bearings 155 in arms 156 which extend backward and are hinged on the shaft 138. The shaft of the roller 154 extends through apertures in the main side pieces 140 which apertures are large enough to allow the impression roller to be raised and lowered about the shaft 138 as a center, the arm 156 acting as a radial arm. The raising and lowering of the impression roller 154 about the shaft 138 as an axis is brought about through the medium of pins 157, Fig. 7, working in slots in the ends of the arms 156 and the pins 157 are mounted in blocks 158 fixed by pins to the shaft 151. Thus by the rocking of the handle 152 which rocks the shaft 151 the impression roller 154 is lowered and raised to and from the gelatin sheet 26 on the bed 27.

A clamping roller 159 is carried in roller bearings 160 in blocks 161 hinged at 162 to the frame pieces 140. This roller 159 is normally held always in contact with the impression roller 154 through the medium of springs 163 connected to arms 164 and the other end of the springs are connected to adjustable bolts 165 provided with thumb nuts 166 working against brackets 167 which are a part of larger brackets 168 secured by rivets 169 to the side frame pieces 140. The roller 159 is retreated or released from contact with the roller 154 by arms 170 fixed to the shaft 151 and connected at 171 to curved links 172 connected by pins 173 to the aforementioned carrying blocks 161. Thus on the rocking of the hand lever 152 from the position of Fig. 7 to that of Fig. 10 the roller 159 is pushed backward to position shown in Fig. 10 thus extending the springs 163 and opening a clear space for the admission of the paper sheet 148 up against the edge 217 of the paper stop bar 174 and on the reverse movement of the handle 152 from Fig. 10 to that of Figs. 7 and 8, the paper is clamped between the rollers 154 and 159 and onto the gelatin sheet as shown by Fig. 8, the edge of the paper at this position abutting against the edge 217 of the paper stop bar 174 and held slightly above the gelatin sheet by a narrow margin of the paper resting on the projecting edge of an adjustable plate 175 on the paper stop member 174, the purpose being to hold this sharp edge of the paper always free of the gelatin but near thereto for the purpose of preventing the paper sheet edge from cutting in to the gelatin sheet particularly as relates to thick paper or card board as may be used with these machines.

To prevent the paper 148 as it is fed into position against the wall 217 of stop bar 174 and the edge of the plate 175 from coming in contact with the gelatin sheet 26 there is provided a movable guard plate 176 which is supported at its ends in slots in the frame pieces 140 which permits this guide to slide horizontally backward and forward as desired. The position of Fig. 10 shows this guard plate in a forward position while Fig. 8 shows it retreated. In order to stiffen the plate 176, I provide the vertical flange 177 turned up out of the body of the plate and the edge of this flange is turned over horizontally into a narrow flange 178, see Fig. 10, and to this flange there is connected some small brackets 179 to which are secured the connecting rods 180 by nuts 181. The connecting rods 180 are secured into some sockets 182 of some end pieces 183 which are hinged at 184 to arms 185 fixed to the shaft 151. Thus on the rocking of the shaft 151 by the handle 152 the guard plate 176 is moved forward and retreated as desired and when forward it prevents the sheet of paper being fed directly onto the gelatin sheet 26 and when retreated it leaves a clear way for the impression roller 154 which presses the paper down onto the gelatin sheet as indicated by Fig. 8.

When the impression carriage is in the position indicated by Fig. 10 it is supported by the small flanged rollers 186 upon the studs 187 secured into the frame pieces 140 and these rollers 186 ride on the outer edges of the bed plate piece 27 with their flanges extending down over the edges of the bed plate piece, and in this manner the impression carriage is made to ride in direct alignment backward and forward over the bed 27 the other end or outer end being guided and carried on the shaft 138 through the medium of the gears 139 and rollers 150, however, when the impression roller 154 is down heavily upon the paper pressing it to the gelatin sheet as indicated by Figs. 1 and 8 then the load is taken off from the small rollers 186 and carried by the impression roller 154 itself. This impression roller is rubber faced for better adhesion to the paper and for purposes of better impression of the paper in contact with the gelatin sheet 26.

The paper stop bar 174 provided with the adjustable plate 175 is best shown in Fig. 13, the plate 175 being supported by screws 188 working through slots 189 in the bar 174. The edge 190 of the plate 175 is turned upwards into a vertical flange and through this flange there passes some adjusting screws 191 screwed into the blocks 192 in the bar 174 in the manner that the amount of the projecting edge 175 may be made greater or less in relation to the face 217 of the bar 174 against which the paper is made to abut, thus there may be provided as wide a shelf as may be desired for holding the sharp edge of the paper from the gelatin sheet as the same is pressed down by the impression roller 154 and onto the gelatin portion 26 on the bed 27. For certain classes of work it is desirable to move this paper stop or abutment bar 174 in different positions forward and back over the bed of the machine and for this purpose I provide means for moving this stop to any position desired through the medium of supporting the same by the side arms 193 to which the bar 174 is connected. These side arms are mounted upon a shaft 194 which extends through the slots 136 from side to side of the machine and carries mounted thereon the gear wheels 195 which are fixed to the said shaft and revolved therewith. Thus as this paper stop may be moved backward and forward through the medium of the shaft 194 it is always held squarely across the machine.

The gears 195 are held in mesh with the racks 137 through the medium of the small idle rollers 196. These rollers 196 and gears 195 are substantially a duplication of the gears 139 and the rollers 150 on the shaft 138 of the impression carriage.

In order to secure paper stop bar 174 in fixed positions along the bed 27 of the machine, I provide a stop 197 in the form of a short section of rack which fits into the rack 137, see Figs. 14 and 15, and is mounted on little studs 198 which slide through the right hand bar 193 and are connected on the outside to a block 199 on the outside of the bar 193.

A hand knob 200 having a stud portion 201 is secured at 202 into the rack piece 197. On the portion 201 there is a spring 203 which automatically presses the rack piece 197 into engagement with the rack teeth of the bars 137 when permitted to do so by the release of the hand knob piece 200. Fig. 14 shows 197 disengaged from rack 137 and Fig. 15 shows it engaged therewith.

Thus in the adjustment of the paper stop backward and forward over the bed 27 the knob 200 is pulled out releasing the short rack piece 197 from the side rack 137 and then the bar 174 with its plate 175 can be slightly lifted about the shaft 194 as a center and then moved forward or back as desired and brought again to rest at the point desired, whereupon the spring 203 will again lock the rack piece 197 into engagement with the teeth of the rack 137, the corners of the teeth being rounded off slightly to facilitate this engagement as shown by Figs. 14 and 15.

After the paper has been clamped to the gelatin roll as indicated by Fig. 8 the carriage is then moved forward and back making the impression or taking the copy as desired.

On the forward movement of the carriage the handle 152 is limited in its movement by the natural position of the impression roller 154 upon the paper but on the return movement if the operator is not careful in the use of his hand on this handle he may open or lift the impression roller 154 and bring about the opening shown by Fig. 10 before the return movement of the carriage is complete.

To prevent such accidental opening there is provided a locking latch 204, see Figs. 23 and 24, at the right side of the machine. This latch 204 has a small projection 205 adapted to engage in a notch 206 in the right frame piece 140 and this latch piece is hinged at 207 to the hinge pin 184 at the right of the machine on the arm 185. A projection 208 of the latch 204 extends downward and is engaged by the bar 174 at the completion of the return position of the carriage to where it again is to receive a fresh sheet for a new impression. Fig. 23 shows the latch disengaged while Fig. 24 shows the latch engaged being the position of the parts when the carriage is being moved forward over the gelatin sheet making the impression.

Projections 209 on the frame bars 140 abut against the bar 174 and thus furnish the return stop or limit of movement as the carriage is returned home.

Sometimes it is desirable to limit the forward or outward movement of the carriage for special classes of work and when this is desired, there is provided an adjustable stop which may be set at any desired position along the side of the bed against which the impression carriage may be registered as desired. This stop, see Figs. 1 and 26, is composed of a hand hold piece 210 onto a stem 211 to which is secured a short section of rack 212, see Fig. 26, which is adapted to engage one of the racks 137 and thus hold the stop from sliding longitudinally upon the bed of the machine.

The stem 211 is engaged by a spring 213 working in the block 214 into which the stem 211 slides and this block 214 has a projection 215 which engages the inside of the rack bar 137 and the top projection 216 which engages the bed plate 27. Thus the operator may quickly adjust this stop backward or forward to suit the desired position of registry of movement of the impression carriage.

The applicant has disclosed novel features in this application which are also disclosed in his co-pending applications Ser. Nos. 14,840; 18,326; 54,750; and 108,058; and expressly reserves the right to claim any novelty not covered by the claims of this application as allowed in another co-pending application.

What I claim is:

1. In a machine of the class described, a bed for supporting a gelatin pad sheet of the hectograph type, means for drawing the said gelatin pad sheet over the bed and locking the same in fixed positions step by step as portions of the gelatin pad sheet are used, spindles upon which the gelatin pad sheet is wound and carried, and said spindles provided on their ends with discs slightly larger than the entire gelatin pad sheet when wound upon the spindle, a chuteway for receiving and carrying spindles and provided with tracks upon which the disc ends of the said spindles roll and travel and said chuteway inclined in a manner to cause the spindles to roll down through the chuteway, means under the control of the operator for taking out a spindle at the lower end of the chuteway and carrying it up and holding it in position in relation to the said bed in a manner to hold and permit the unwinding of the gelatin pad sheet and placing the same over the said bed; in combination with an impression roll carriage adapted to move over the bed and gelatin pad sheet in the function of making impressions on the hectograph principle.

2. In a machine adapted to use a gelatin pad sheet in the form of a strip wound upon spindles at each end of the machine and adapted to be transferred from one spindle to the other and passed over an impression bed between the two spindles, means for engaging the ends of the said spindles and holding them in position adapted to be rotated in the winding of the gelatin pad sheet upon the spindles and means for moving said spindle engaging means in and out of engagement of the ends of the spindles and said movement being in a direction longitudinal of the spindles.

3. In a machine, an impression bed adapted to support a gelatin pad sheet in the form of a strip wound upon spindles at each end of the machine and the said gelatin pad sheet adapted to be transferred from one spindle to the other and passed over said impression bed between the two spindles, means for engaging the ends of the said spindles and holding them in position adapted to be rotated in the winding of the gelatin pad sheet upon the spindles and means for moving in and out of the engagement of the ends of the spindles the said spindle engaging means and said movement being in a direction longitudinal of the spindle; in combination with an impression carriage adapted to impress paper onto the body of the gelatin pad sheet upon said bed.

4. In a machine of the class described, a bed adapted to receive, support and hold a gelatin pad sheet in position to permit impressions to be taken therefrom, detachable spindles adapted to be held at each end of the bed in a manner to be rotated in the function of unwinding and winding a gelatin pad sheet from one spindle over the bed onto the other spindle, and said spindles provided with disc flanges on their ends adapted to roll in chuteways, a magazine for surplus spindles composed of a chuteway extending under the bed of the machine and inclined in a manner that gravity action will carry the spindles down through the chuteway, means for picking up a spindle out of the delivery end of the chuteway and lifting it to position at one end of the said bed; in combination with an impression carriage adapted to move backward and forward over the bed and impress paper thereto.

5. In a machine of the class described, a bed adapted to support a gelatin pad sheet in position for taking impressions therefrom on the hectograph principle, means for holding detachable spindles in the machine in relation to the said bed and a chuteway for the said spindles adapted to carry a surplus stock of gelatin pad sheets wound upon spindles and said chuteway located beneath the said bed.

6. In a machine of the class described, a bed for taking impressions from a gelatin pad sheet supported on said bed, spindles mounted at each end of the bed and arranged to carry the gelatin pad sheet as the same is unwound from one spindle and wound upon the other spindle at the other end of the said bed, a chuteway adapted to hold a surplus stock of gelatin pad sheets wound upon spindles and said chuteway being substantially in letter S form located beneath the bed.

7. In a machine of the class described, means for holding a spindle in a machine comprising a spindle shaft located and supported in alignment with the spindle upon which the gelatin pad sheet is carried and means for moving the said spindle shaft lengthwise by a cam movement and returning the same by a spring movement in the function of disengaging and engaging the spindle shaft with the spindle.

8. In a machine of the class described, a spindle adapted to hold and carry a gelatin pad sheet and support the same in the machine in a manner to wind thereon the said gelatin pad sheet, means for engaging the ends of the said spindle composed of blocks mounted in the machine and adapted to be reciprocated lengthwise of the said gelatin pad sheet carrying spindle, cam movements for simultaneously moving said blocks at each end of the spindle lengthwise of the spindle and spring movements for returning the said blocks to engagement with the spindle.

9. In a machine of the class described, a bed adapted to hold and support a gelatin pad sheet, an impression carriage mounted to be moved forward and backward over the said bed in the function of impressing paper thereto, spindles adapted to carry the said gelatin pad sheet arranged at each end of the said bed and means provided for winding the sheet from one spindle upon the other as different sections of the gelation pad sheet are used, a moistening device composed of a roll revolving within a water box and means for adjusting the said roller automatically up in contact with the gelatin pad sheet as the same is carried on one of the spindles, said means for adjusting the said moistening device being hinged in arms adapted to swing said moistening device downwardly into a retreated position in a direction toward and underneath the bed.

10. In a device of the class described, a moistening device supported beneath the spindle upon which the gelatin pad sheet is wound and adapted to automatically press up against the gelatin pad sheet as the same is carried by the spindle and means for holding the said moistening device away from the said spindle and gelatin pad sheet, said holding away means being composed of supporting links connected to cross shafts in parallel relationship and with connecting bars between said links and a hand lever cooperatively associated with one of said cross shafts, said hand lever being engaged by a spring adapted to hold said mechanism in position of retreat of said moistening device.

11. In a machine of the class described, a chuteway for supporting rolls upon spindles the opening of the chuteway being at the front of the machine and the delivery end at the rear of the machine, means for picking up a roll from the delivery end of the chuteway and supporting it in position to allow the unwinding and delivery of the gelatin pad sheet upon an impression bed; in combination with an impression bed and an impression carriage adapted to impress paper onto the gelatin pad sheet when on the said bed.

12. In a machine of the class described, an impression bed adapted to support a gelatin pad sheet, gelatin pad spindle holding means at the front near end of the said machine, a chuteway adapted to carry rolls and arranged below the bed and adapted to carry a stock of rolls, means for picking up a roll out of the chuteway and holding the same in position at the rear far end of the bed in a manner to allow the unwinding of the gelatin pad sheet from the spindle thus held at the rear far end of the bed.

13. In a machine of the class described, an impression bed adapted to support a gelatin pad sheet, an impression carriage adapted to impress paper on the gelatin pad sheet on the said bed, spindle holding means at the near end of the said bed adapted to hold the spindle upon which a gelatin pad sheet is wound, spindle holding means at the rear of the said bed for holding the gelatin pad sheet in the unwinding operation and said spindle holding means at the rear of the bed mounted to move to and from a magazine holding surplus rolls; in combination with a magazine for holding surplus rolls adapted to deliver the rolls to the spindle holding means at the rear of the bed.

14. In a machine of the class described, a magazine for rolls including a chute providing an inclined passageway whereby said rolls may travel down said chute to the bottom of the magazine by force of gravity in succession one after the other, arms mounted upon a rocking shaft and carrying on their outer ends spindle supporting means adapted to enter and embrace the ends of the spindles upon which the rolls are wound, cam movements adapted to spread the said arms in the function of entering into the spindles in taking a spindle out of the said magazine.

15. In a machine of the class described, an impression bed and an impression carriage adapted to coact and impress paper to a gelatin pad sheet located between the said bed and carriage, a chuteway for holding surplus rolls arranged beneath the bed and a moistening device mounted also beneath the bed and adapted to distribute moisture upon the gelatin pad sheet, means for supporting the gelatin pad sheet at each end of the bed on spindles adapted to be rotated in winding the gelatin pad sheet from one spindle to the other in drawing the gelatin pad sheet over the said bed and said moistening device adapted to automatically contact with the gelatin pad sheet as the same varies in its diameter as it is unwound from a supporting spindle.

16. In a machine of the class described, a bed adapted to support a gelatin pad sheet, spindle mountings at each end of the bed adapted to support and carry a gelatin pad sheet wound thereon, a moistening device mounted beneath one of the spindles and adapted to distribute moisture upon the gelatin pad sheet as it is unwound from a spindle at one end of the said bed, one of said spindle mountings being adapted to be raised and lowered in relation to said bed.

17. In a machine of the class described, a bed adapted to support and carry a gelatin pad sheet, spindles adapted to support the said gelatin pad sheet as the same is wound thereon, a moistening device composed of a roller mounted to revolve in a water container and supported beneath one of the spindles upon which the said gelatin pad sheet is wound and means for automatically keeping the said roller in contact with the gelatin pad sheet as the same is wound on one of the said spindles, said automatic means being composed of a weighted lever connected by cross shafts, parallel arms and connecting bars.

18. In a machine of the class described, a bed adapted to support a gelatin pad sheet of the hectograph type, a spindle supporting means at each end of the said bed adapted to support spindles upon which the said gelatin pad sheet is wound, a magazine for carrying the surplus spindles upon which surplus gelatin sheets are wound and means for carrying a gelatin pad spindle from the said magazine to position at one end of the machine, a moistening device mounted to apply moisture to the gelatin pad shet held in position at one end of the machine, and means for moving the moistening device to and from the said gelatin pad sheet when on the said spindle and moving it clear of the path of the travel of the said carrying means which carries a spindle from the magazine to position at one end of the machine.

19. In a machine of the class described, a bed for supporting a gelatin pad sheet, spindle supporting means at each end of the bed for supporting gelatin pad rolls, a magazine for holding surplus spindles for said gelatin pad rolls and a carrier adapted to carry spindle rolls from the said magazine to a position at the end of the bed.

20. In a machine of the class described, a bed adapted to support a gelatin pad sheet, spindles at each end of the said bed adapted to carry gelatin pad sheets wound thereon, a magazine for carrying surplus gelatin pad sheet carrying spindles mounted beneath the bed, a carrier adapted to carry a spindle from the magazine to the position at one end of the bed and means provided in the carrier for holding the gelatin pad spindle in service position in the machine.

21. In a machine of the class described, a bed adapted to support a gelatin pad sheet trained over thereon, spindle supporting means arranged at each end of the bed adapted to carry the said gelatin pad sheet, a magazine located beneath the bed and adapted to carry a surplus of gelatin pad sheets wound thereon, means for taking successively out of the said magazine a spindle carrying a fresh roll of gelatin pad sheet and holding it in service position at one end of the said bed.

22. In a machine of the class described, a bed adapted to support a gelatin pad sheet and said sheet carried on spindles by being wound thereon, a spindle location at the front of the machine which remains in the same constant and fixed position and adapted to revolve and wind a spindle in the operation of moving different sections of the gelatin pad sheet over the said bed; in combination with a secondary or supply supporting spindle means located at the other end of the bed and adapted to support a spindle from which a gelatin pad sheet is unwound and this secondary spindle supporting means movable in its character in the function of supplying a fresh roll of gelatine pad sheet.

23. In a machine of the class described, a bed adapted to support a gelatin pad sheet for hectograph work, spindle supporting means permanently located at one end of the bed, and spindle supporting means of movable character loaded at the opposite end of the bed both of said means adapted to hold spindles upon which the said gelatin pad sheet is wound and means operable from a distance for changing spindles at said opposite end.

24. In a machine of the class described, a bed adapted to support a gelatin pad sheet trained over the same for use for hectograph work, spindle holding means located at the front of the machine and adapted to hold and revolve a spindle upon which the gelatin pad sheet is wound, spindle holding means at the other end of the bed; in combination with a magazine for holding a surplus stock of spindles and a reciprocating carrier adapted to move and carry spindles from the magazine to one end of the said bed.

25. In a machine of the class described, a bed adapted to support a gelatin pad sheet trained over the same for use for hectograph work, spindle holding means located at the front of the machine and adapted to hold and revolve a spindle upon which the gelatin pad sheet is wound, spindle holding means at the other end of the bed; in combination with a magazine for holding a surplus stock of spindles and a reciprocating carrier adapted to move and carry spindles from the magazine to one end of the said bed, and said carrier mounted on a rocker shaft actuated in its movement by the operator of the machine.

26. In a machine of the class described, a bed adapted to support a gelatin pad sheet trained over the same for use for hectograph work, spindle holding means located at the front of the machine and adapted to hold and revolve a spindle upon which the gelatin pad sheet is wound, spindle holding means at the other end of the bed; in combination with a magazine for holding a surplus stock of spindles and a reciprocating carrier adapted to move and carry spindles from the magazine to one end of the said bed, and said carrier mounted on a rocker shaft actuated in its movement by the operator of the machine, and provided with counter balancing means for the purpose of balancing the movement of the loading and unloading of the spindle carrier.

27. In a machine of the class described, a bed adapted to support a gelatin pad sheet used in hectograph work, an impression carriage mounted to move backward and forward over the said bed and gelatin pad sheet carried thereby and provided with means for impressing paper to the gelatin pad sheet on the said bed; in combination with a paper stop abutment registering means extending across the said bed and adapted to coact with the said movable carriage in determining the position of registry of the paper as the same is applied to the gelatin pad sheet on the bed and said paper stop abutment registering means adjustable longitudinally of the said bed and gelatin pad sheet.

28. In a machine of the class described, a bed adapted to support a gelatin pad sheet used in hectograph work, an impression carriage mounted to move backward and forward over the said bed and gelatin pad sheet carried thereby and provided with means for impressing paper to the gelatin pad sheet on the said bed; in combination with a paper stop abutment registering means extending across the said bed and adapted to coact with the said movable carriage in determining the position of registry of the paper as the same is applied to the gelatin pad sheet on the bed and said paper stop abutment registering means adjustable longitudinally of the said bed and gelatin pad sheet and provided with locking means for locking it at any desired position along the length of the bed.

29. In a machine of the class described, a bed, a movable carriage adapted to move over the bed and impress paper onto a gelatin sheet carried by the bed, a paper registering stop extending across the bed lying close to the surface of the gelatin pad sheet on the bed and said stop composed of a cross member having a vertical wall against which the edge of the paper is abutted and with a horizontal wall underneath the said vertical wall and the said horizontal wall adjustable longitudinally of the bed in a manner to produce a wider or narrower shelf underneath the vertical wall of the said paper stop and the said vertical wall and horizontal wall coacting to form an abutment for the end of the paper in its registration on the gelatin pad sheet in a manner to protect the sharp edge of the paper from damaging the gelatin pad.

30. In a machine of the class described, a bed, a gelatin pad sheet trained over the bed for use in hectograph work, an impression carriage movable along the bed in the function of impressing paper to the gelatin pad sheet, a paper stop for registering the end of the paper as the same is applied to the bed and said stop composed of two members one of them having a vertically arranged wall and the other a horizontally arranged wall and the latter lying close to the surface of the gelatin pad sheet and projecting forward of the vertically arranged wall in a manner to receive the end of the sheet of paper and hold it clear of the gelatin pad and the said members adjustable to each other in a manner to project a wider or narrower horizontal shelf upon which the paper contacts as the same is fed thereto.

31. In a machine of the class described, a bed, a gelatin pad sheet trained over the bed for use in hectograph work, an impression carriage movable along the bed in the function of impressing paper to the gelatin pad sheet, a paper stop for registering the end of the paper as the same is applied to the bed and said stop composed of two members one of them having a vertically arranged wall and the other a horizontally arranged wall and the latter lying close to the surface of the gelatin pad sheet and projecting forward of the vertically arranged wall in a manner to receive the end of the sheet of paper and hold it clear of the gelatin pad and the said members adjustable to each other in a manner to project a wider or narrower horizontal shelf upon which the paper contacts as the same is fed thereon, and the said members connected to a cross shaft extending underneath the bed and provided with gears at each end thereof, racks located on each side of the said bed and adapted to be engaged by the said gears on the said cross shaft in a manner that the rotation of the said cross shaft under the influence of the said gears and rack causes the said paper stop members to travel squarely in their adjustment forward and back over the bed.

32. In a machine of the class described, a bed, a gelatin pad sheet trained over the bed, racks on each side of the said bed adapted to assist in controlling the movement of an impression carriage, an impression carriage mounted above the said bed and connected to a cross shaft adapted to control the movement of the said carriage, a cross shaft mounted underneath the said bed and connected to the said impression carriage and with gears mounted at each end of the said cross shaft and fixed thereto and mounted to be engaged into the said racks in a manner that as the impression carriage is moved the said cross shaft, gears and rack cause the same to move in parallel relationship with the said bed; in combination with a paper stop registering device for registering the paper in relation to the gelatin pad sheet as the same is fed to the impression carriage and said paper stop adjustable in different positions across the length of the bed.

33. In a machine of the class described, a bed, a gelatin pad sheet trained over the bed, an impression carriage mounted across the bed and adapted to carry an impression roll and said roll supported in frame member pieces hinged at one end to the frame of the carriage and at the other end connected to be raised and lowered through the medium of arms connected to a rocker shaft and said rocker shaft adapted to be vibrated backward and forward under the control of a hand lever; in combination with a clamping roll adapted to clamp paper to the impression roll and mounted to be moved to and from the said impression roll in the frame of the said carriage with a link motion connected to arms on the said rocker shaft and connected to the supporting means on the said clamping roll and adapted to move the said clamping roll to and from the said impression roll under the influence of the movement of the said rocker shaft and springs arranged to hold the said clamping roll in contact with the said impression roll.

34. In a machine of the class described, a bed, a gelatin pad sheet trained over the bed, an impression carriage mounted by frame pieces extending along each side of the said bed and supported by rollers in contact with the said bed, one set of which rollers are above the top of the bed and the other set beneath the bed, and the said carriage hinged at each side of the bed about an axis transverse to said bed in a manner to permit the lifting of the impression roller up clear of the bed to permit access to the gelatin pad sheet.

35. In a machine of the class described, a bed, a gelatin pad sheet trained over the bed in the form to be used for hectograph work, an impression carriage mounted to travel backward and forward over the bed and the gelatin pad sheet carried thereon, an impression roller mounted in the said carriage and across the said bed and adapted to be raised and lowered in the said carriage and in relation to the gelatin pad sheet on the said bed, a clamping roller adapted to move to and from the said impression roll in clamping paper thereto, a paper stop extending across the bed and adapted to register the ends of the sheets of paper fed to the carriage, a paper guard plate carried by the carriage and located underneath the said clamping roll and close to the surface of the gelatin pad sheet and adapted to move to and from the position of the said impression roll in a manner to guide the paper free of the gelatin pad sheet as the paper is fed to and underneath the impression roll.

36. In a machine of the class described, a bed, a gelatin pad sheet trained over the bed for hectograph work, an impression carriage mounted to reciprocate backward and forward over the bed and the gelatin pad sheet carried thereon, and said impression carriage provided with an impression roll adapted to be moved upward and downward in the carriage toward and from the gelatin pad sheet on the bed and a clamping roll adapted to move to and from the said impression roll and a guard plate located underneath both of the said rolls and extending across the bed and lying close to the gelatin pad sheet and adapted to be moved forward and back longitudinally of the bed and coact with a paper stop for registering the paper in a manner to direct the paper clear of the gelatin pad and into the paper stop; in combination with a paper stop registering device extending across the bed and lying close to the gelatin pad carried thereon and coacting with the said paper guard to register the paper in a fixed position while the same is being moved by the impression roller to and from contact with the gelatin pad sheet.

37. In a machine of the class described, a bed, a gelatin pad sheet trained over the bed for hectograph work, an impression carriage mounted to reciprocate backward and forward over the bed and the gelatin pad sheet carried thereon, and said impression carriage provided with an impression roll adapted to be moved upward and downward in the carriage toward and from the gelatin pad sheet on the bed and a clamping roll adapted to move to and from the said impression roll and a guard plate located underneath both of the said rolls and extending across the bed and lying close to the gelatin pad sheet and adapted to be moved forward and back longitudinally of the bed and coact with the paper stop for registering the paper in a manner to direct the paper clear of the gelatin pad and into the paper stop; in combination with a paper stop registering device extending across the bed and lying close to the gelatin pad carried thereon and coacting with the said paper guard to register the paper in a fixed position while the same is being moved by the impression roller to and from contact with the said gelatin pad sheet, and the said paper stop acting as a stop or registering means for the impression carriage at its location when the paper is fed thereto.

38. In a machine of the class described, a bed, a gelatin pad sheet trained over the bed for hectograph work, an impression carriage mounted to reciprocate backward and forward over the bed and the gelatin carried thereon, and said impression carriage provided with an impression roll adapted to be moved upward and downward in the carriage toward and from the gelatin pad sheet on the bed and a clamping roll adapted to move to and from the said impression roll and a guard plate located underneath both of the said rolls and extending across the bed and lying close to the gelatin pad sheet and adapted to be moved forward and back longitudinally of the bed and coact with the paper stop of the gelatin pad and into the paper stop; in combination with a paper stop registering device extending across the bed and lying close to the gelatin pad carried thereon and coacting with the said paper guard to register the paper in a fixed position while the same is being moved by the impression roller to and from contact with the gelatin pad sheet, and the said paper stop acting as a stop or registering means for the impression carriage at its location when the paper is fed thereto, and the said paper stop adjustable in different positions across the bed in longitudinal arrangement of the said gelatin pad sheet.

39. In a machine of the class described, a bed, a gelatin pad sheet trained over the said bed for hectograph work, an impression carriage mounted across the bed and with frame members extending down the sides thereof, an impression roller extending across the bed and mounted in the said impression carriage by means of arm frame members also extending along the sides of the bed, a clamping roller extending across the bed in parallel relationship to the said impression roller and mounted in the said carriage and moved by springs to contact with the said impression roller and moved away from the said impression roller by link motions, a rocker shaft extending across the frame of the impression carriage and connected to raise and lower the said impression roller and connected by the said link motion to move the said clamping roller away from the said impression roller.

40. In a machine of the class described, a bed, a gelatin pad sheet trained over the bed for use in hectograph work, an impression carriage mounted to travel backward and forward over the pad and impress paper to the gelatin pad sheet carried thereon, an impression roller mounted in the said carriage and connected to be moved up and downward by a rocker shaft also mounted in the said carriage and a rocker shaft mounted across the carriage and connected to move the said impression roller, a locking catch connected to the said rocker shaft and adapted to engage a frame member of the impression carriage and hold the said rocker shaft in a fixed position which position being that of making the impression, a paper stop extending across the bed and adjustable longitudinal of the bed and adapted also to form a stop for the return movement of the impression carriage and also form a release means for the said locking catch for the said rocker shaft.

41. In a device of the class described, the combination with a supporting stand, of a chuteway for rolls of film passing downwardly from the front to the rear of said stand and means, manually operable from the front of said stand, for engaging and elevating a roll from the rear of said stand.

42. In a device of the class described, a stand having a chuteway extending downwardly in a zigzag path and terminating at the rear of said stand, a pivotally mounted lever arm on each side of said chuteway, spindle engaging devices carried by and near a free end of each of said arms, means for spreading and for releasing said lever arms for bringing said spindle engaging devices in alignment with the spindle at the discharge end of said chuteway.

43. In a machine of the class described, the combination with a gelatin pad supporting bed, of an impression carriage mounted over said bed and provided with an impression roller, a clamping roller, and means, including said rollers, for clamping and feeding paper between said impression roller and a gelatin pad sheet on said bed, a cross shaft serving as a hinge for said impression carriage and provided with terminal gears rotating therewith, and a rack mounted on each side of said bed and engaged with one of said gears.

Signed at Chicago, in the county of Cook and State of Illinois, this 22nd day of April, 1925.

WILLIAM ERASTUS WILLIAMS.